(12) United States Patent
Aust

(10) Patent No.: US 9,663,057 B2
(45) Date of Patent: May 30, 2017

(54) COMPENSATING PERFORATION FOR AIRBAG DECOR WEAKENING

(71) Applicant: Lisa Draexlmaier GmbH, Vilsbiburg (DE)

(72) Inventor: Stefan Aust, Hohenthann (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 14/956,305

(22) Filed: Dec. 1, 2015

(65) Prior Publication Data
US 2016/0159309 A1    Jun. 9, 2016

(30) Foreign Application Priority Data

Dec. 2, 2014 (DE) .......................... 10 2014 117 692

(51) Int. Cl.
*B60R 21/16* (2006.01)
*B60R 21/2165* (2011.01)

(52) U.S. Cl.
CPC ................................ *B60R 21/2165* (2013.01)

(58) Field of Classification Search
CPC .............. B29C 44/351; B60R 21/2165; B60R 2021/21652
USPC .............................................. 280/728.3, 732
See application file for complete search history.

(56) References Cited

U.S. PATENT DOCUMENTS

| | | | |
|---|---|---|---|
| 5,997,030 A * | 12/1999 | Hannert | B60R 21/2165 280/728.3 |
| 6,709,007 B2 * | 3/2004 | Gray | B29C 44/351 280/728.3 |
| 7,014,209 B2 * | 3/2006 | Muller | B60R 21/2165 280/728.3 |
| 7,029,025 B2 * | 4/2006 | Schwark | B60R 21/2165 280/728.3 |
| 7,278,654 B2 * | 10/2007 | Weissert | B60R 21/2165 280/728.3 |
| 7,607,681 B2 * | 10/2009 | Okada | B26D 3/08 280/728.3 |

(Continued)

FOREIGN PATENT DOCUMENTS

| | | |
|---|---|---|
| DE | 4418583 A1 | 3/1995 |
| DE | 19930754 A1 | 1/2000 |

(Continued)

*Primary Examiner* — Toan To
(74) *Attorney, Agent, or Firm* — Finnegan, Henderson, Farabow, Garrett & Dunner LLP

(57) ABSTRACT

An airbag cover may be configured to tear along weakening lines during deployment of an airbag. The airbag cover may comprise a carrier for the airbag and a decorative layer arranged on the carrier. The decorative layer may include a primary weakening line and a secondary weakening line, where the primary weakening line and the secondary weakening line may be configured to fracture when the airbag deploys. The primary weakening line may extend in a longitudinal direction, the secondary weakening line may extend in the longitudinal direction, the primary weakening line and the secondary weakening line may be separated by a distance extending in a direction perpendicular to the longitudinal direction, and the primary weakening line and the secondary weakening line may be separated by a non-weakened section. Methods for producing a weakening region in an airbag cover may also be provided.

18 Claims, 2 Drawing Sheets

(56) References Cited

U.S. PATENT DOCUMENTS

| | | | | |
|---|---|---|---|---|
| 9,022,418 B2* | 5/2015 | Topart | .................. | B60R 21/213 |
| | | | | 280/728.3 |
| 2005/0225062 A1* | 10/2005 | Dumbrique | ......... | B60R 21/2165 |
| | | | | 280/728.3 |
| 2006/0267314 A1* | 11/2006 | Yasuda | ............... | B60R 21/2165 |
| | | | | 280/728.3 |
| 2012/0315446 A1* | 12/2012 | Wisniewski | ........ | B32B 38/0004 |
| | | | | 428/195.1 |

FOREIGN PATENT DOCUMENTS

| | | |
|---|---|---|
| DE | 19937373 A1 | 2/2001 |
| DE | 102007045304 A1 | 4/2008 |
| DE | 102009048893 A1 | 4/2011 |
| JP | 2014113883 A | 6/2014 |
| WO | WO 2006111212 A1 | 10/2006 |

\* cited by examiner

COMPENSATING PERFORATION FOR AIRBAG DECOR WEAKENING

TECHNICAL FIELD

The present invention relates to an airbag cover for a vehicle having an airbag, comprising a carrier and a decorative layer arranged on the carrier, wherein the decorative layer comprises at least one predetermined tear line composed of multiple primary weakening lines that are spaced apart from each other and separated by non-weakened sections.

Airbag covers are generally used in vehicles to ensure the reliable opening of an airbag, without showing visible weakening of the decorative layer on the visible side facing the observer.

PRIOR ART

Airbag covers typically include a tear seam so as to predetermine the site of an opening for the deployment of an airbag which is formed during a deployment of the airbag through the cover. Such tear seams frequently include a weakened region in the form of a recess, a groove, or a score, which are formed in a surface area of the cover. Upon deployment of the airbag, the cover ideally tears open along these scores or this recess so as to form the opening for the airbag to deploy.

DE 199 37 373 A1 describes the formation of a continuous weakening essentially along a non-linear, for example zigzag-shaped or meander-shaped line, along the longitudinal direction of a tear edge for an airbag.

An H-shaped weakening is apparent from DE 199 30 754 A1.

WO 2006/1112121 describes the introduction of mutually spaced perforations that completely penetrate the material in the region of the boundary of an airbag cover. A completely penetrating perforation for weakening the outer skin is also apparent from DE 44 18 583 A1.

While the provision of a predetermined perforation establishes the defined tearing of an airbag contour, the configuration of a defined, exactly predeterminable perforation line has been found to be problematic, in particular when using leather, which by nature does not have a defined strength structure.

An undefined tearing behavior can be avoided or prevented by providing a pronounced perforation having a high tear proportion and short non-weakened sections, so that the perforation is substantially followed upon tearing. However, this entails the disadvantage that the pronounced perforation line is more easily visible to the observer, which is undesirable in particular when the decorative layer is leather.

DESCRIPTION OF THE INVENTION

It is therefore the object of the invention to provide an airbag cover for a vehicle, which, on the one hand, has low visibility with respect to a perforation line and, on the other hand, nonetheless ensures reliable tearing during deployment of the airbag.

This object is achieved by an airbag cover for a vehicle having an airbag according to the subject matter of claims 1 and 16. Preferred embodiments of the cover according to the invention will be apparent from the dependent claims.

An essential aspect of the invention is to provide a decorative layer, which is arranged on a carrier and comprises at least one predetermined tear line composed of multiple primary weakening lines that are spaced apart from each other and separated by non-weakened sections, wherein multiple secondary weakening lines are provided along the non-weakened sections. These secondary weakening lines have a longitudinal extension direction that is substantially identical to that of the primary weakening lines and extend from one line end at least partially in the direction of the primary weakening lines for returning a non-predetermined tear to the predetermined tear line.

Such an arrangement of secondary weakening lines advantageously achieves that a tear, which departs from the predetermined tear line and therefore becomes a non-predetermined tear, is returned to the predetermined tear line again by way of the secondary weakening lines.

The airbag cover according to the invention therefore allows the visibility of the primary weakening line to be minimized, while increasing the tearing reliability due to arrangement of the secondary weakening lines.

The return of a potential non-predetermined tear to the predetermined tear line is ensured in that the secondary weakening lines extend at least partially in the direction of the primary weakening lines on at least one line end.

According to the invention, multiple secondary weakening lines are provided in the decorative layer along the non-weakened sections, the secondary weakening lines having a longitudinal extension direction that is substantially identical to that of the primary weakening lines. In this way, it is possible to select comparatively large distances comprising non-weakened sections between the primary weakening lines, which ensure the desired low visibility of the predetermined tear line.

The secondary weakening lines preferably have a length that corresponds to at least half a distance, preferably at least the distance, between two neighboring primary weakening lines. Because the distance between two neighboring primary weakening lines essentially corresponds to the length of the non-weakened sections, the secondary weakening lines have a length that corresponds to at least half the length, preferably at least the length, of the non-weakened sections. If the lengths of the non-weakened sections vary, or the distance between the primary weakening lines along the predetermined tear line varies, the lengths of the secondary weakening lines can likewise be adapted to the lengths of the non-weakened sections or the distances at the same ratio.

As an alternative or in addition, the secondary weakening lines can be offset from the primary weakening lines along the predetermined tear line between the primary weakening lines and perpendicularly to the predetermined tear line.

In this way, it is achieved that a tear departing from the primary weakening line is returned to an adjoining primary weakening line again on the shortest possible path. In this way, a non-predetermined tear can be particularly effectively avoided, in particular when the lengths of the secondary weakening lines correspond to at least half the length or the entire length of the non-weakened sections.

The two line ends of a secondary weakening line preferably extend in the direction of neighboring primary weakening lines. This as well allows a non-predetermined tear to be directly directed or returned from a primary weakening line to a secondary weakening line nearby in one direction, or both directions, of the predetermined tear line.

The secondary weakening lines preferably have a shape that is inclined and straight, or at least partially curved, in relation to the primary weakening line. This advantageously results in a plurality of design patterns for the secondary weakening lines so as to be able to satisfy the particular circumstances of the decorative layer in the region of the predetermined tear line.

The secondary weakening lines are preferably arranged on both sides of the predetermined tear line. In this way, it is ensured that all directions of a non-predetermined tear can be returned to the predetermined tear line.

The primary weakening lines and the secondary weakening lines are preferably arranged on a back side of the decorative layer. The visibility of the weakening lines of the decorative layer is therefore reduced further, which is advantageous in particular when natural leather is used.

According to one embodiment, the carrier has a notch or opening edge in the region of the primary weakening lines. In conjunction with the arrangement of the weakening lines on the back side of the decorative layer, this not only eliminates a protracted alignment of the weakening lines over the airbag section, but also ensures that the decor is torn open rapidly at this predetermined region of the carrier in the event of the deployment of the airbag.

According to a further, particularly preferred embodiment, an initial point for initial tearing of the decorative layer is defined on the predetermined tear line, wherein the line ends of the secondary weakening lines which extend toward the primary weakening lines are located on both sides of the initial point at the end of the secondary weakening lines which lies furthest away from the initial point. The line ends of the secondary weakening line are therefore arranged in a predetermined manner in such a way that a non-predetermined tear is directed in a predetermined direction originating from the initial point. The initial point itself can be designed, for example, as a particularly deep and long line, compared to the remaining primary weakening lines, at one point of the predetermined tear line, or can be composed of one or more particularly short, optionally punctiform, deep lines or line sections on the predetermined tear line. The initial point of an airbag cover can therefore also be described as an initial region.

The weakening depth in the decorative layer is preferably 0.5 mm to 2.0 mm and/or the residual wall thickness of the decorative layer in the region of the weakening line is 0.1 mm to 0.7 mm, preferably 0.5 mm. In this way, it is ensured that good tearing of the decorative layer during deployment of the airbag is made possible, and the visible side remains intact even after aging, which is to say, the weakening remains invisible.

According to a preferred embodiment, the distance between the primary weakening lines and the secondary weakening lines perpendicular to the longitudinal extension direction is smaller than or equal to the distance between the primary weakening lines in the longitudinal extension.

For example, the distance between the primary weakening lines and the secondary weakening lines perpendicular to the longitudinal extension direction is 1.5 mm to 3.5 mm, preferably 2.0 mm.

For example, the distance between the primary weakening lines in the longitudinal extension is 1.7 mm to 3.5 mm, preferably 2.5 mm.

For example, the length of the primary weakening lines in the longitudinal extension is 2.0 mm to 4.0 mm, preferably 3.0 mm.

For example, the length of the secondary weakening lines in the longitudinal extension is 1.0 mm to 3.0 mm, preferably 2.0 mm.

Experience has shown that an optimal balance between minimum visibility and maximum tearing reliability can be achieved with the described dimensional ranges.

In a further preferred embodiment, the primary weakening lines and the secondary weakening lines are introduced into the decorative layer by way of a punch, a cutter blade, a laser, particularly preferably by way of a pulsed laser, or by way of a roller.

These measures allow the weakening lines to be introduced in a simple manner into the decorative layer in the form of a regular pattern.

According to a particularly preferred embodiment, the material of the decorative layer is leather or synthetic leather. Alternatively, the material can also comprise plastic, TPO 2 or TEPEO 2.

The secondary weakening lines and the primary weakening lines preferably have a different depth in the region of the start and/or end of the predetermined tear line, in particular in the region of the initial point. In this way, the initiation and the targeted continuation of a non-predetermined tear is facilitated in the region of the weakening lines.

The method according to the invention for producing a weakening region for an airbag cover for a vehicle having an airbag comprises the following steps:
   providing a carrier;
   providing a decorative layer;
   forming a plurality of primary weakening lines and secondary weakening lines, wherein multiple primary weakening lines interrupted by non-weakened sections are arranged spaced apart from each other so as to form a predetermined tear line, and wherein multiple secondary weakening lines are arranged along the primary weakening lines, the secondary weakening lines extending at least partially in the direction of the primary weakening lines at least from one line end;
   arranging the decorative layer on the carrier, wherein the primary weakening lines and the secondary weakening lines are arranged on a side of the decor which faces the carrier.

In this way, multiple of the two types of weakening lines are distributed across a predetermined region of the back surface of the decorative layer. All weakening lines can therefore already be introduced into the decorative layer during production of the decorative layer, so that a protracted alignment of the weakening or of the weakening lines of the decorative layer over the airbag section is eliminated. The weakening lines are preferably arranged on the decorative layer in such a way that both types of weakening lines have the same longitudinal extension direction.

In a preferred embodiment, the plurality of primary weakening lines and secondary weakening lines are formed by guiding a pulsed laser beam in a single line or in multiple lines across the back side of the decorative layer. This advantageously achieves a predeterminable weakening depth of the weakening lines in the decorative layer.

When the plurality of primary weakening lines and secondary weakening lines are being formed, the pulsed laser beam is preferably guided with the aid of a scanner in such a way that exactly one laser pulse is emitted at an impingement site, which effectuates a local ablation of the decorative layer.

In a further preferred embodiment, the decorative layer is arranged on the carrier in such a way that the primary weakening lines of the decorative layer are arranged over a notch of the carrier at least partially offset from the same. This favors a defined initiation and a defined progression of the tear formation of the weakening lines and thus ensures reliable tearing of the airbag cover.

DETAILED DESCRIPTION OF PREFERRED EMBODIMENTS OF THE INVENTION

The invention will be described in more detail hereafter based on purely exemplary embodiments with reference to FIGS. 1 to 5.

Figure 1:
FIG. 1 shows a schematic top view onto an airbag cover comprising a tear seam from the prior art.

FIG. 1 shows an airbag cover comprising a tear seam from the prior art. Such tear seams frequently include a weakened region in the form of a recess, a groove, or a score, which are formed in a surface area of the cover. The weakened region is illustrated in the form of a dotted line of a U-shaped flap here, wherein a dashed line represents a recess or score, and the region provided between two dashed lines represents a web. Upon deployment of the airbag, the cover ideally tears open along these dashed lines so as to form an opening for deployment having the outline of the U-shaped flap at the location of the dashed lines.

A fundamental difficulty is to configure the dashed lines in the least visible manner possible, which is to say having a high share of webs, on the one hand, and to ensure a good, defined opening function, which is to say a high share of weakenings or lines, on the other hand. It is therefore desirable to create an airbag cover that not only has low visibility with respect to the tear line, but also still ensures reliable tearing during deployment of the airbag. This applies in particular to airbag covers that have a leather surface because the mechanical properties of leather, being that it is a natural material, are subject to nature-induced fluctuations.

Figure 2:
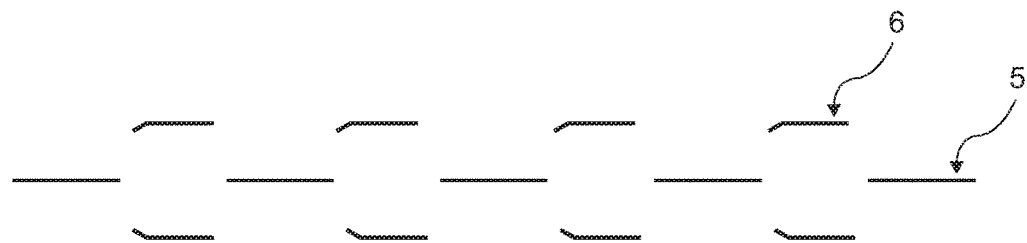
FIG. 2 schematically shows the primary weakening lines and secondary weakening lines arranged on the back side of a decorative layer according to the present invention.
Figure 4:
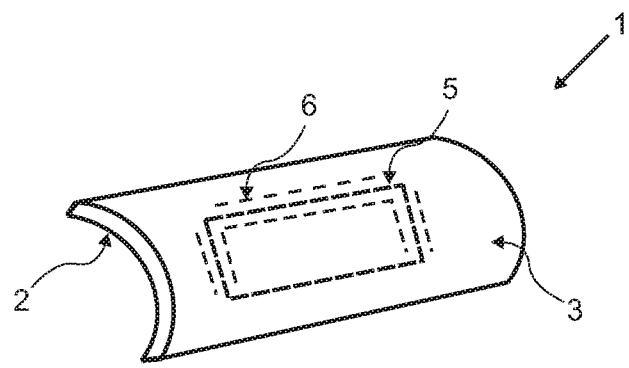
FIG. 4 shows a schematic oblique view of an airbag cover having a tear seam composed of primary weakening lines and secondary weakening lines according to the present invention.

FIGS. 2 and 4 schematically show the predetermined tear line arranged on the back side of a decorative layer 3, which is to say primary weakening lines 5, having additional secondary weakening lines 6 according to the present invention. The secondary weakening lines 6 are arranged on both sides of the central predetermined tear line 5 and have a longitudinal extension direction that is substantially the same. They extend from one line end, or both line ends, at least partially in the direction of the primary weakening lines 5 to return a non-predetermined tear to the predetermined tear line 5.

Such secondary weakening lines are used to achieve that a tear, which departs from the predetermined tear line 5 due to inhomogeneous leather structures, for example, is returned to the predetermined tear line 5 again. It is therefore possible both to increase the distances between the dashed lines in FIG. 1 and thereby minimize the disadvantageous visibility of the same, and at the same time to increase the tearing reliability by arranging the secondary weakening lines 6.

One line end, or both line ends, which is not shown here, of a secondary weakening line 6 extends or extend in the direction of neighboring primary weakening lines 5. This allows the immediate, targeted return of a non-predetermined tear to a primary weakening line 5 of the predetermined tear line nearby.

The airbag cover 1 in FIG. 4 furthermore comprises a carrier 2, and a decorative layer 3 arranged on top of the carrier, for example leather, having a back side facing the carrier and a visible side facing away from the carrier. The decorative layer 3 comprises the described weakenings for forming the primary weakening lines 5 and the secondary weakening lines 6 at least on the back side. The carrier 2 includes a U-shaped opening edge, for example, through which the airbag deploys if needed and which predefines the outline of the airbag section. The position of the predetermined tear line in the decorative layer 3 can be predefined, for example, by a weakening that at least partially penetrates the carrier, the weakening being formed by substantially rectilinearly extending, sequential individual weakenings and being arranged slightly offset in relation to the predetermined tear line 6.

Figure 3:
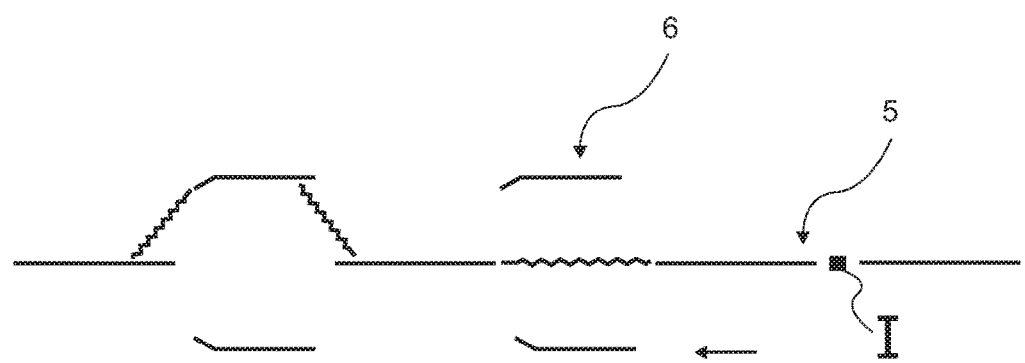
FIG. 3 schematically shows the return of a non-predetermined tear line on primary weakening lines and secondary weakening lines arranged on the back side of a decorative layer according to the present invention.

FIG. 3, on the one hand, schematically shows the return of a non-predetermined tear line from a primary weakening line 5 to a neighboring primary weakening line 5 with the aid of the secondary weakening line 6 according to the present invention. The secondary weakening lines 6 and the primary weakening lines 5 are arranged offset from each other both along the longitudinal extension direction thereof and perpendicularly, whereby a tear departing from the primary weakening line 5 can be returned to an adjoining primary weakening line 5 again on a short path.

The middle portion of the figure, on the other hand, shows a predetermined tear, as it will ideally occur with minimal distances between the primary weakening lines 5, but otherwise takes on a more random progression. The minimal distances between the primary weakening lines 5, however, result in the lines being undesirably visible in the decor.

The right portion of the figure shows an initial point for tearing of the decorative layer on the predetermined tear line, wherein the line ends of the secondary weakening lines which extend toward the primary weakening lines are located at the end of the secondary weakening lines which lies furthest away from the initial point. In the figure, the predetermined tear, as indicated by the arrow, extends from right to left. The line end of the secondary weakening line is therefore arranged in a predetermined manner in such a way here that a non-predetermined tear is directed in a predetermined direction originating from the initial point.

The individual line ends of the secondary weakening lines 6 which extend toward the primary weakening lines 5 can be provided at the line end directed away from the initial point I, or at both line ends.

A possible tear progression is shown as a winding line; the tear direction is indicated by the arrow.

FIG. 4 shows a schematic oblique view of an airbag cover 1 having a tear seam composed of primary weakening lines 5 and secondary weakening lines 6 according to the present invention. The airbag cover 1 comprises a fixed carrier 2, on top of which a decorative layer 3 is arranged. A haptic layer, which conveys a soft surface impression, can additionally be provided between the carrier 2 and the decorative layer 3.

The airbag cover 1 can be an integral part of a steering wheel cover, of a center console, of a dashboard or similar interior components, for example.

Figure 5:
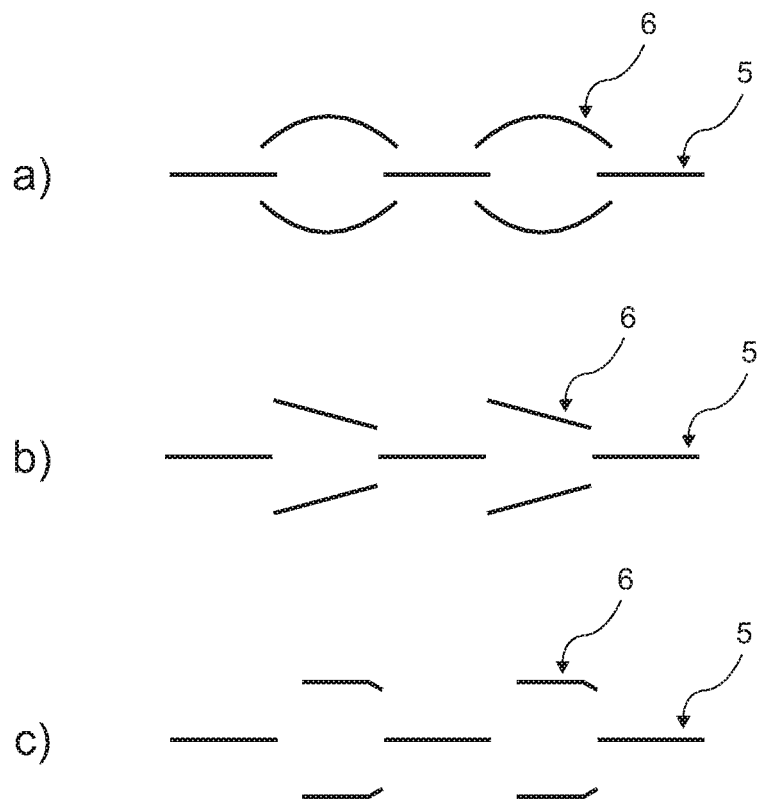
FIGS. 5 a)-c) show possible embodiments and arrangements of the secondary weakening lines by way of example.

FIGS. 5 a) to c) show further possible embodiments and arrangements of the secondary weakening lines 6 by way of example. The secondary weakening lines 6 generally have a shape that is inclined and straight, see FIG. 5b, or at least partially curved, see FIGS. 5a and 5c, in relation to the primary weakening line 5. Moreover, a plurality of design patterns are conceivable for the secondary weakening lines 6 so as to satisfy the particular circumstances of the airbag cover 1, of the leather 3 or of the carrier 2 in the region of the predetermined tear line.

What is claimed is:

1. An airbag cover configured to tear along weakening lines during deployment of an airbag, the airbag cover comprising:
    a carrier for the airbag; and
    a decorative layer arranged on the carrier, wherein the decorative layer includes a first primary weakening line, a second primary weakening line, and a secondary weakening line, the first primary weakening line, the second primary weakening line, and the secondary weakening line being configured to fracture when the airbag deploys;
    wherein:
        the first and second primary weakening lines extend in a longitudinal direction;
        the secondary weakening line extends in the longitudinal direction;
        the first primary weakening line and the secondary weakening line are separated by a distance extending in a direction perpendicular to the longitudinal direction;
        the first primary weakening line and the secondary weakening line are separated by a non-weakened section;
        the first primary weakening line is a neighboring distance away from the second primary weakening line; and
        a distance between the first primary weakening line and the secondary weakening line is smaller than or equal to the neighboring distance between the first primary weakening line and the second primary weakening line.

2. The airbag cover according to claim 1, wherein the secondary weakening line has a length that is at least half of the neighboring distance.

3. The airbag cover according to claim 1, wherein a portion of the secondary weakening line extends in a direction toward the first primary weakening line.

4. The airbag cover according to claim 1, wherein the secondary weakening line is curved.

5. The airbag cover according to claim 1, wherein the secondary weakening line is a first secondary weakening line, and the first secondary weakening line and a second secondary weakening line are arranged on opposite sides of a predetermined tear line.

6. The airbag cover according to claim 5, wherein the first and second secondary weakening lines extend in the longitudinal direction.

7. The airbag cover according to claim 1, wherein the first primary weakening line and secondary weakening line are arranged on a back side of the decorative layer facing the carrier.

8. The airbag cover according to claim 1, wherein the carrier includes a notch configured to enhance a tearing speed of the decorative layer during deployment of the airbag.

9. The airbag cover according to claim 1, wherein an initial point for tearing the decorative layer is defined on a predetermined tear line,
    the secondary weakening line comprises a first end and a second end, and
    wherein the first end is located farther from the initial point than the second end.

10. The airbag cover according to claim 1, wherein a weakening depth in the decorative layer is 0.5 millimeters (mm) to 2.0 mm and a residual wall thickness of the decorative layer is 0.1 mm to 0.7 mm.

11. The airbag cover according to claim 1, wherein the first primary weakening line, the second primary weakening line, and the secondary weakening line are formed in the decorative layer by at least one of a punch, a cutter blade, a laser, or a roller.

12. The airbag cover according to claim 1, wherein a material of the decorative layer is leather or synthetic leather.

13. The airbag cover according claim 1, wherein the secondary weakening line and the first primary weakening line have a first depth in a first region and a second depth in a second region.

14. A method for producing a weakening region in an airbag cover, comprising:
    forming a primary weakening line and a secondary weakening line in a back side of a decorative layer arranged on a carrier;
    wherein:
        the primary weakening line extends in a longitudinal direction;
        the secondary weakening line extends in the longitudinal direction;
        the primary weakening line and the secondary weakening line are separated by a distance extending in a direction perpendicular to the longitudinal direction;
        the primary weakening line and the secondary weakening line are separated by a non-weakened section; and
        the primary weakening line is arranged at least partially offset in relation to a notch of the carrier.

15. The method according to claim 14, wherein the first primary weakening line and the secondary weakening line are formed by a pulsed laser beam.

16. The method according to claim 15, wherein one laser pulse of the pulsed laser beam forms the first primary weakening line.

17. The method according to claim 14, wherein a portion of the secondary weakening line extends in a direction toward the first primary weakening line.

18. The method according to claim 14, wherein the secondary weakening line is curved.

* * * * *